Nov. 25, 1958 W. S. BOWEN 2,861,737
AIR INDUCING APPARATUS
Filed Sept. 4, 1953 2 Sheets-Sheet 1

FIG.I.

INVENTOR.
WILLIAM SPENCER BOWEN
BY
Campbell, Brumbaugh, Free + Graves
HIS ATTORNEYS.

Nov. 25, 1958 W. S. BOWEN 2,861,737
AIR INDUCING APPARATUS
Filed Sept. 4, 1953 2 Sheets-Sheet 2

INVENTOR.
WILLIAM SPENCER BOWEN
BY
Campbell, Brumbaugh, Free
Graves HIS ATTORNEYS.

United States Patent Office 2,861,737
Patented Nov. 25, 1958

2,861,737

AIR INDUCING APPARATUS

William Spencer Bowen, Westfield, N. J.

Application September 4, 1953, Serial No. 378,482

3 Claims. (Cl. 230—105)

This invention relates to novel apparatus for power generation, and more particularly relates to the efficient employment of a relatively small head of water for generating power.

Power plants located on rivers have generally been constructed employing hydraulic turbines utilizing relatively large heads of water. In order to supply such heads, either a dam was constructed or it was necessary to erect the plant adjacent to a large waterfall. Furthermore, the potential power in the water at a relatively small head leaving the turbine gates was generally wasted. Also, if a steam generating plant was employed, the waterflow from the tail pipe of a barometric or similar condenser at a small head did not serve a useful function.

Accordingly, it is an object of the present invention to provide apparatus for utilizing a small head of water for efficiently generating power.

It is another object of the invention to employ the waterflow from a power plant for efficiently generating power.

It is a still further object of the invention to provide apparatus for inducing air into a stream of water.

These and further objects are accomplished in accordance with the invention by providing an air inducer through which water from a low head flows. A Venturi fall tube coupled to the inducer serves to carry the water deep into the earth to an air dome, wherein the entrained air is released.

Due to the head of water leading to the earth's surface, this air is under high pressure and may be directed to a constant pressure burning chamber at the surface wherein it is heated and furnished to suitable power generating means such as a gas turbine, which exhausts to the atmosphere. The gas turbine may be coupled to an electric generator or other appropriate utilization means.

The generation of power in the foregoing manner employs a most efficient cycle, namely, isothermal compression, constant pressure heating, adiabatic expansion, and constant pressure exhaust. This cycle bears many similarities to the Brayton cycle and the diesel cycle, except that isothermal compression, theoretically the most economical form of compression known, is employed in the present invention.

These and other objects and advantages of the invention will be more easily understood when the following description is read in connection with the accompanying drawings in which.

Figure 1:
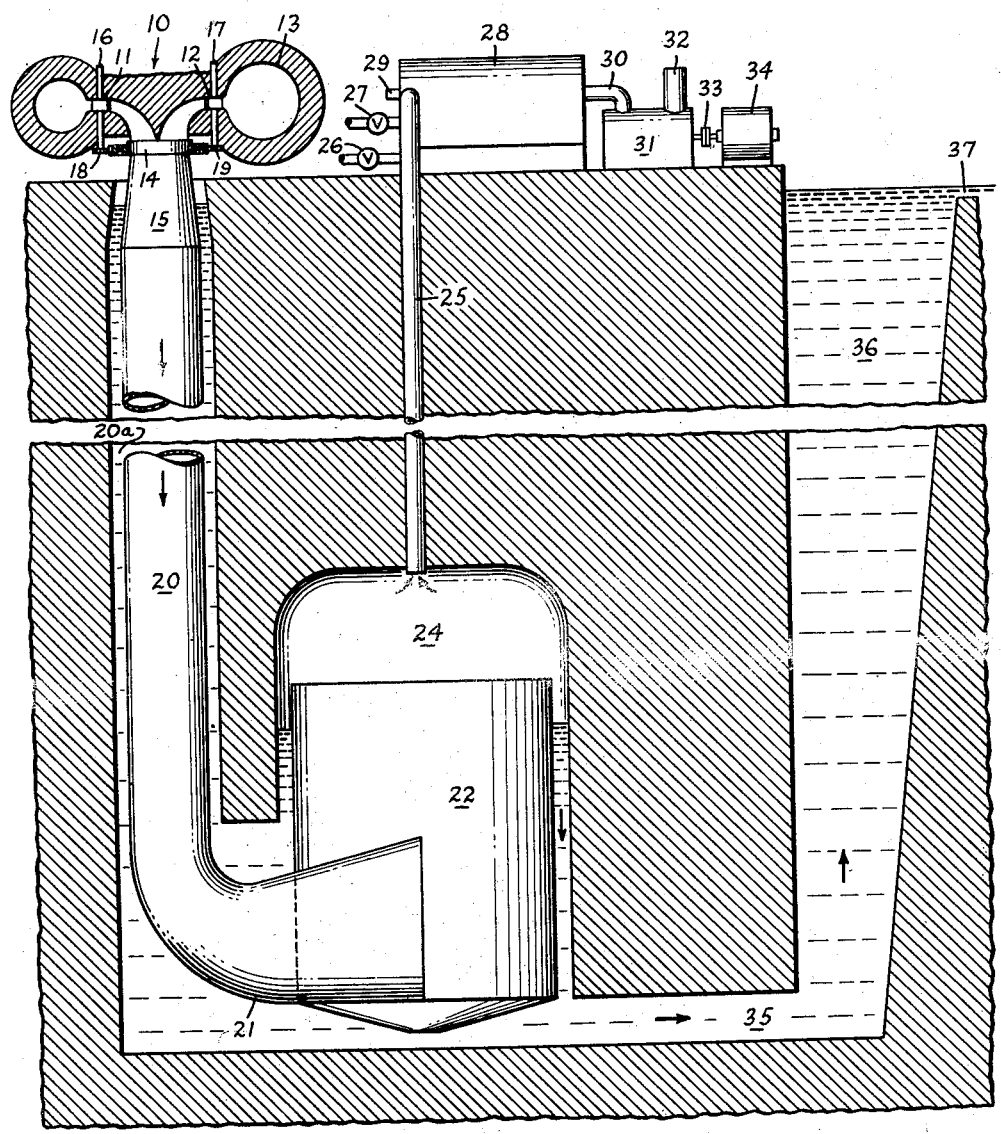
Fig. 1 is a schematic diagram showing apparatus for practicing the present invention.

Referring to the above drawings and particularly to Fig. 1, water from a hydraulic turbine installation 10 flows through the turbine gates 11 and 12 from a casing 13 and across a preferred form of an air inducer 14 to an expansion or draft tube 15. The gates 11 and 12 are controlled by rods 16 and 17, these rods being joined at their lower extremities to pinion gears 18 and 19 which control the air inducer 14, as will be detailed hereinafter.

Coupled to the expansion tube 15 is a Venturi fall tube 20 disposed in a passage 20a cut from and extending deep into the earth. The tube 20 is tangentially joined by an expansion elbow 21 to a cylindrical centrifugal separating chamber 22, opening upwardly to permit the entrained air to escape into an air dome 24, also hollowed out of the earth. In the preferred air-water separator 22 disclosed, the water-flow swirls therein in an arcuate path due to the tangential mounting of the elbow 21 and subsequently overflows into the hollowed out portion of the earth. As indicated by the arrows, the water continues on through passages 35 and 36 carved in the earth to an overflow 37 at the surface.

The air dome 24 communicates with a furnace 28 including an oil burner 29 by means of a tube 25 carrying a safety valve 26 and an operating valve 27 at the upper end thereof for controlling the supply of compressed air. The furnace 28 is joined by a tube 30 to a gas turbine 31, exhausting to the atmosphere at a vent 32 and driving an electric generator 34 through a conventional mechanical coupling 33.

Figure 2:
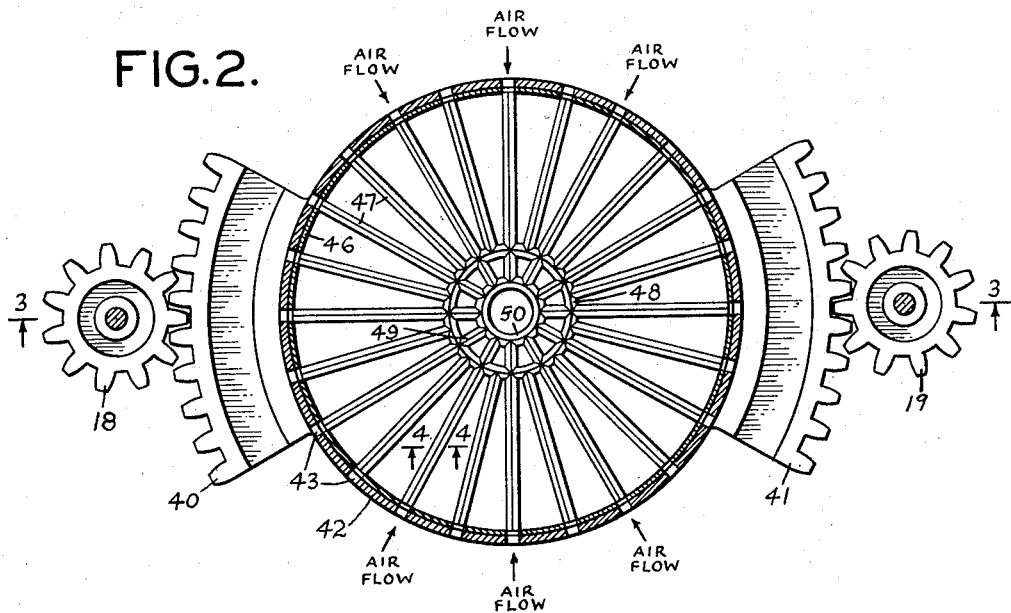
Fig. 2 is a plan view of an air inducer employed in the apparatus of Fig. 1.
Figure 3:
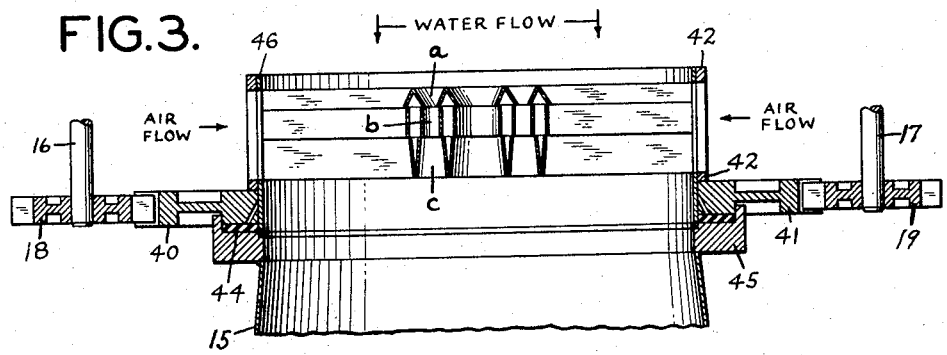
Fig. 3 is a view in elevation of the air inducer taken on the view line 3—3 of Fig. 2 looking in the direction of the arrows.
Figure 4:
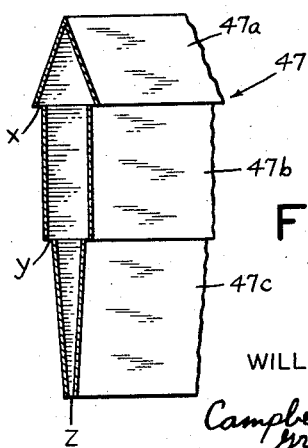
Fig. 4 is a view in elevation and considerably enlarged of a detail of the air inducer taken on the line 4—4 of Fig. 2 in the direction of the arrows.

Referring next to the air inducer 14 shown in detail in Figs. 2, 3 and 4, the driving pinion gears 18 and 19 engage gear segments 40 and 41, respectively, joined to an outer ring structure 42 formed with openings 43 therein, and supported by water lubricated rubber bearing 44, which are in turn supported by a circular member 45 joined to the draft tube 15. Also joined to the draft tube 15 by the member 45 is an inner stationary ring 46 carrying hollow spokes 47 at spaced intervals about the circumference thereof. A hub 48 joins the spokes 47 and is preferably formed with the same configuration as the spokes 47, as will be explained hereinafter. It should also be noted that the hollow spokes 47 communicate with this hollow hub 48 which in turn communicates with further spoke members 49, joined to an inner hub 50, all of these members being hollow and having the configuration shown in Fig. 4. Referring more particularly to this figure, the spoke 47 having segments 47a, 47b and 47c, is illustrated. As the water rushes down over this spoke arrangement, air from the hollow interior thereof will be induced into the water through the openings x, y and z. It will also be noted that the water passages between each of the individual spokes and hubs, are formed similar to a Venturi with converging entrances a, parallel throats b, and expanding exits c. This configuration serves to permit the passage of water therethrough with a minimum of friction losses while producing a maximum of air suction from the hollow spokes and hubs, in accordance with basic Venturi principles.

In a typical operation of this embodiment of the invention, the water from the turbine gates 11 and 12 flows through the air inducer 14, such flow being controlled by the rods 16 and 17 which, through the pinions 18 and 19, also control the air inducer apparatus so that the proper amount of air will be introduced into the water. In order to prevent the compression of the air bubbles in the tube 15 with the resulting introduction of resistance at the outlet of the turbine 10, the tube 15 is expanded to accommodate the increased volume of the stream therethrough. After falling through the tube 15, the tube 20 and the elbow 21, the water and entrained air, which is in the form of finely dispersed bubbles, is received by the centrifugal separator chamber 22, wherein the air bubbles are separated from the water and rise into the dome 24. The water will then continue on through the passages 35 and 36 to the overflow 37.

It is obvious that the air in the dome 24 will be at a pressure determined by the height of the water in the passage 36, such head preferably being great enough, for example, 500 feet, to compress the air to a pressure on the order of hundreds of pounds per square inch. The valve 27 is operated to admit suitable quantities of the compressed air from the dome 24 to the furnace 28 wherein the oil burner 29 heats the air at a constant pressure, such heating preferably taking place directly by the oil combustion.

The heated compressed air then flows to the tube 30 and is expanded through the gas turbine 31 and the vent 32 to the atmosphere, producing power which is transmitted by the linkage 33 to the electric generator 34, in this instance.

Figure 5:
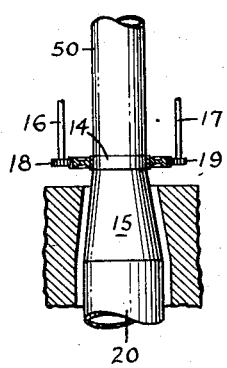
Fig. 5 illustrates a modified form the water supply may take in the apparatus of Fig. 1.

In the event a steam rather than a hydraulic plant is employed, the tail pipe of a barometric or other condenser may lead directly into the air inducer 14 as is shown in Fig. 5. A tail pipe 50 is joined to the air inducer 14, the amount of air induced into the water being controlled as in Fig. 1 by the pinions 18 and 19. However, in this embodiment, the rods 16 and 17 are interconnected with the pinions and the apparatus controlling the flow of water through the condenser into the tail pipe 50. Obviously, a low head dam could also be established to feed water through the air inducer 14 to the draft tube 15 in order to provide compressed air in the dome 24.

Assuming an operating condition wherein the saturated air in the dome stands compressed to 200 pounds per square inch and is heated to 1200° F. by the burning of fuel oil in the furnace 28, its exhaust temperature from the turbine 32 will be above the freezing point of water, thereby preventing icing problems, an important consideration. It is, of course, obivous that the invention is not limited to this specific operating condition.

In comparing the power cycle described above with the conventional diesel cycle, it is immediately apparent that the carrying of the air in intimate contact with the water as finely dispersed bubbles constitutes isothermal compression as opposed to adiabatic compression in the diesel. In addition to the advantages in efficiency when isothermal compression is employed, such compression herein is gained in exchange for only an initial investment, instead of a continuous additional fuel cost of compression. Furthermore, the constant pressure heating in the diesel cycle is theoretical only, since expansion occurs during this portion of the cycle. On the other hand, due to the separate chamber for burning in the present system, constant pressure heating is assured. While both of these cycles employ adiabatic expansion, the diesel is limited by back pressure generated in the exhaust system which includes valves while in the present cycle, the expansion is directly to the atmosphere. Accordingly, a power generating plant in accordance with this invention provides greater thermal efficiency at less cost than may be obtained in connection with diesel engines.

It will be understood that the apparatus disclosed in this description is a representative form of the invention and modifications may be made thereto. For example, different types of air-inducers and air-water separators may be employed in apparatus embodying the present invention, and other forms of furnaces and gas turbine may be employed. Accordingly, the invention is not to be limited by the disclosed apparatus but is defined by the appended claims.

I claim:

1. An air inducer comprising an inner ring, means forming first ports in said ring, hollow radial spokes having one end secured to the inner ring, hub means supporting the other end of said spokes, the interior of said spokes communicating with said first ports, said spokes being formed of a plurality of horizontal hollow segments disposed one above the other in series, the lower transverse dimension of each of the segments above another of the segments being greater than the upper transverse dimension of the segment immediately therebelow to provide downwardly oriented openings at their junctures to induce air into a vertical water flow thereover, the uppermost segment of each spoke being closed at its upper side to prevent the entry of water into the spoke, an outer ring concentrically positioned outside of and in engagement with said inner ring, means forming second ports in said outer ring, and means to rotate said inner and outer rings relatively to each other to move said first and second ports into and out of coincidence and vary the amount of air flowing into the spokes and induced into the downwardly flowing water.

2. An air inducer as defined in claim 1, in which the water passages between said spokes are in the form of Venturi passages to reduce friction losses and provide low pressures at the Venturi throats to assist in air induction.

3. An air inducer as defined in claim 2, in which said hub means comprises a plurality of hubs similar in structure to said spokes, and the water passages between said hubs are in the form of Venturi passages to reduce friction losses and provide low pressures at the Venturi throats to assist in air induction.

References Cited in the file of this patent

UNITED STATES PATENTS

| Number | Name | Date |
|---|---|---|
| 393,488 | Schutte | Nov. 27, 1888 |
| 734,904 | Linton | July 28, 1903 |
| 802,575 | Linton | Oct. 24, 1905 |
| 1,141,308 | Boltz | June 1, 1915 |
| 1,303,781 | Douglas | May 13, 1919 |
| 1,813,543 | Pescara | July 7, 1931 |
| 2,089,646 | Friedrich | Aug. 10, 1937 |
| 2,675,218 | Bletcher et al. | Apr. 13, 1954 |